United States Patent [19]

Dubroy

[11] Patent Number: 5,372,422
[45] Date of Patent: Dec. 13, 1994

[54] APPARATUS FOR AUTOMATICALLY STIRRING FOOD DURING COOKING

[76] Inventor: Gary P. Dubroy, 6397 Frederica St., Niagra Falls, Ontario, Canada, L2A 4C1

[21] Appl. No.: 158,381

[22] Filed: Nov. 29, 1993

[51] Int. Cl.⁵ .................. B01F 7/20; A47J 43/044
[52] U.S. Cl. .................. 366/143; 366/251; 366/282; 366/312; 99/348
[58] Field of Search ............... 366/197, 143, 242-251, 366/281-284, 309, 312, 313, 325; 99/341, 348

[56] References Cited

U.S. PATENT DOCUMENTS

| | | | |
|---|---|---|---|
| 401,306 | 4/1889 | Schock et al. | 366/284 |
| 656,123 | 8/1900 | Kempf | 366/284 |
| 880,349 | 2/1908 | Ayers | 366/283 X |
| 1,163,982 | 12/1915 | Dore | 366/242 |
| 2,042,176 | 5/1936 | Hausman | 366/251 |
| 2,376,722 | 5/1945 | Podell | 366/282 |
| 3,322,403 | 5/1967 | Murphy | 366/247 |
| 3,357,685 | 12/1967 | Stephens | 99/348 X |
| 3,697,053 | 10/1972 | Will | 366/281 X |
| 4,104,737 | 8/1978 | Brailsford | 366/312 X |
| 4,151,792 | 5/1979 | Nearhood | 99/348 |
| 4,856,910 | 8/1989 | Cushchera | 366/282 |
| 4,952,069 | 8/1990 | Boulard | 366/312 |
| 5,013,158 | 5/1991 | Tarlow | 99/348 X |
| 5,193,441 | 3/1993 | Hayashi | 99/348 |

Primary Examiner—David A. Scherbel
Assistant Examiner—Charles Cooley
Attorney, Agent, or Firm—Michael J. Colitz, Jr.

[57] ABSTRACT

An automatic stirrer including a battery powered electric motor driven set of stirring blades held in position atop a cooking container enabling unattended automatic stirring of foodstuff during the cooking process. Also included are components for setting stirring speed, sealing the automatic stirrer at the cooking container interface, and for adjusting the stirrer for use with a wide variety of cooking container diameters and depths. A transparent window is provided to view cooking foodstuffs and, in one embodiment, to provide ventilation. In an alternate embodiment a timer is provided which enables operation over a fixed period, and in yet another alternate embodiment a stirrer blade set is provided which precludes sticking of foodstuff to the cooking container bottom.

1 Claim, 3 Drawing Sheets

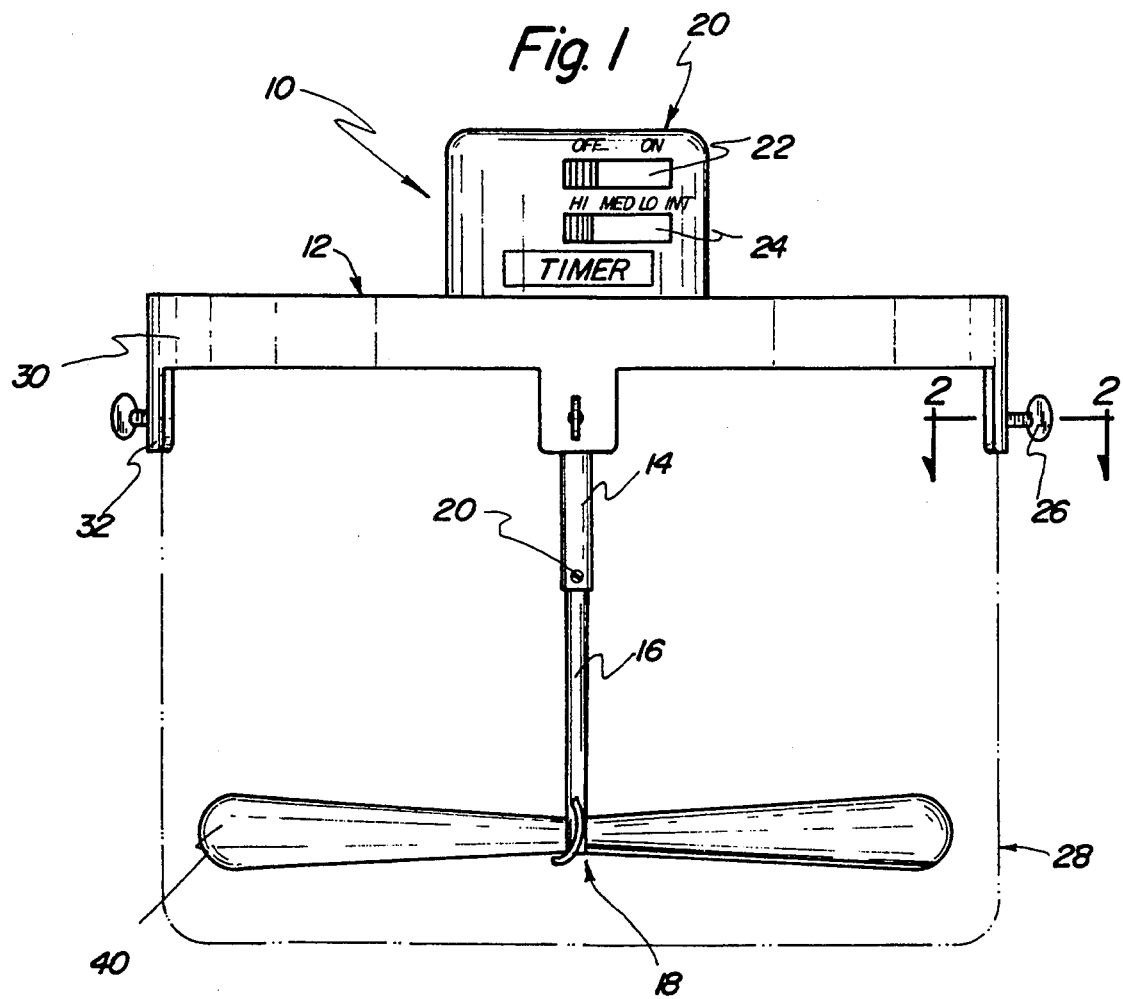
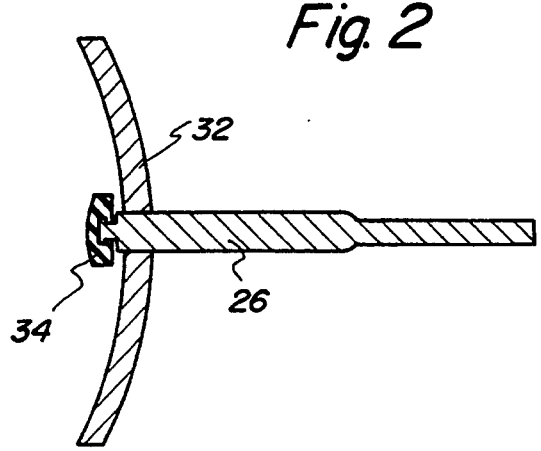

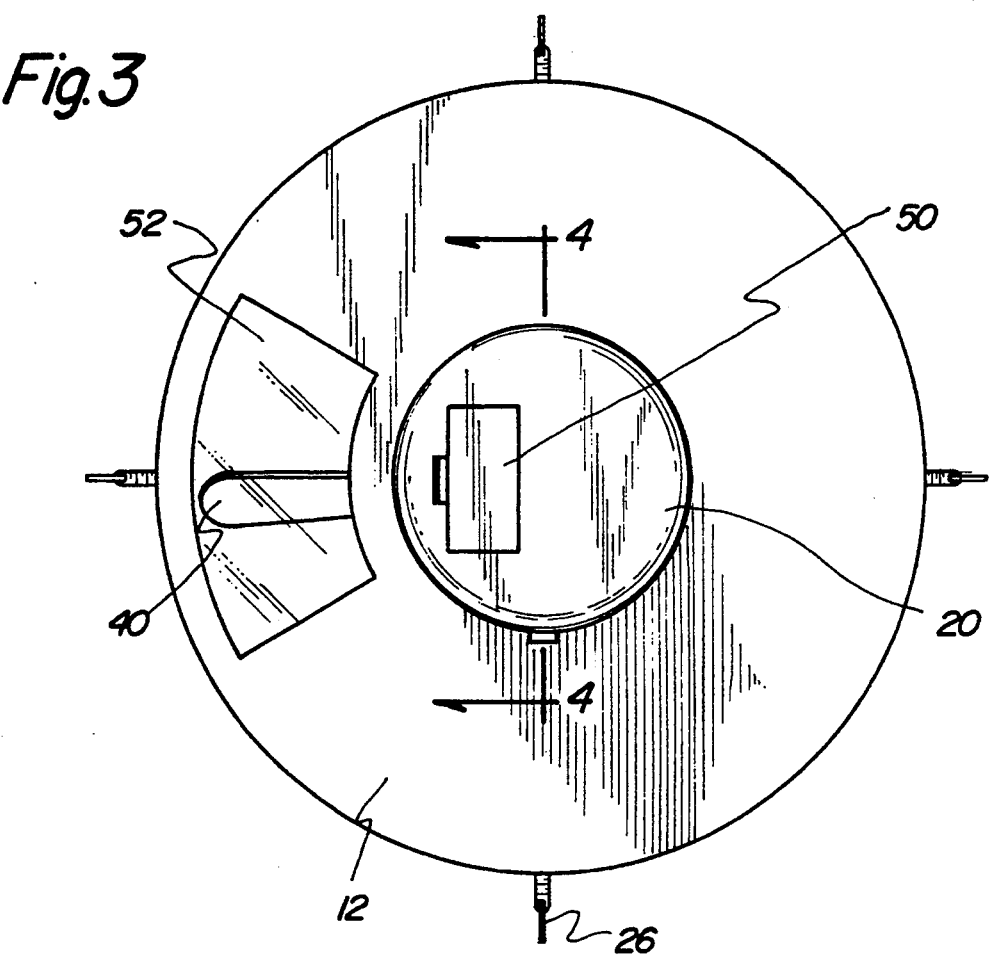
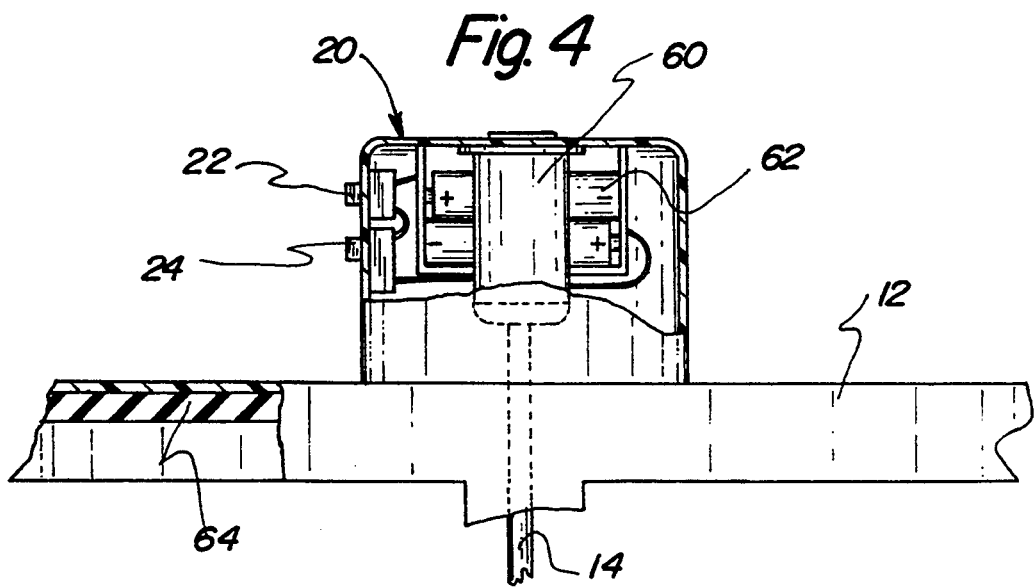

Fig. 5
Fig. 6
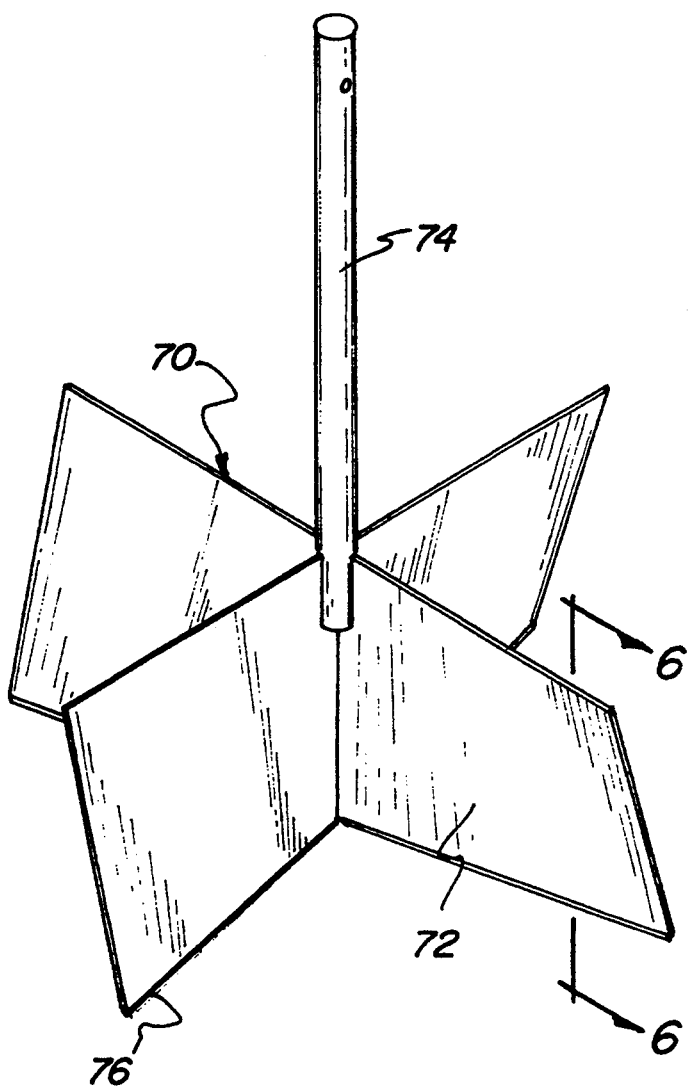
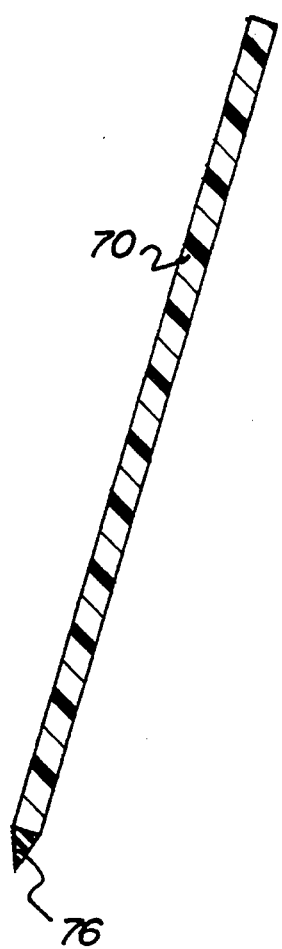

APPARATUS FOR AUTOMATICALLY STIRRING FOOD DURING COOKING

BACKGROUND OF THE INVENTION

1. Field of the Invention

The present invention relates to automatic stirrers and more particularly pertains to an automatic stirrer which may be utilized for unattended stirring of foods during cooking using self contained electrical power while performing in various timed and stirring rate modes.

2. Description of the Prior Art

The use of automatic stirrers is known in the prior art. More specifically, automatic mixers and stirrers heretofore devised and utilized for the purpose of automatic stirring are known to consist basically of familiar, expected and obvious structural configurations, notwithstanding the myriad of designs encompassed by the crowded prior art which have been developed for the fulfillment of countless objectives and requirements.

For example, U.S. Pat. No. 4,822,172 to Stottmann discloses an electric food mixer with three operator selected modes based on an internal timer and a motor speed controller. The Stottmann invention has no provision for installation on various cooking utensils, is not self contained, and exhibits a further disadvantage in lacking an ability to be implemented during the cooking process. The present invention is adaptable to a wide range of cooking utensils, is self contained, and is suitable for operation in the adverse cooking environment.

In U.S. Pat. No. 4,922,464 to Kamprath a portable mixer for processing food is disclosed. The Kamprath invention discloses a portable mixer with means for cooling the driving motor and an associated gear train by directing internal air flow through the housing and particularly through the mixer handle. While the Kamprath invention may provide user comfort in cooling the grip area and enable mixing of powders without disruption by air flow from the motor cooling system there is little or no application to the present invention wherein the unattended stirring of cooking foods is desirable. The present invention is not hand held, has the advantage of operation at cooking temperatures, and additionally exhibits no cooling air flow internal to the cooking utensil.

In U.S. Pat. No. 4,936,688 to Cornell a food stirring apparatus is described. The Cornell invention describes a food mixer having a mixing head and a set of upper and lower mixing blades affixed to a central axle and relatively offset an angle of sixty degrees. The mixing blades are perforated with a plurality of elliptical holes to produce efficient mixing of fluid mixtures. The present invention includes a single blade set which is constructed of sturdy materials rendering the invention usable during cooking. Additionally, the whole present invention including the blade set is adaptable to a series of cooking utensils including standard cook pot depths and diameters.

In U.S. Pat. No. 5,000,578 to Artin et al. a food mixing appliance is disclosed for mixing foods or other materials using a pair of mixing implements performing an equivalent function to mixing blades. The Artin invention features a detachable mixing head wherein the mixer is rendered inoperable when the mixing head is removed. A disadvantage in this prior art lies in a lack of an ability to use the mixer for automatic and unattended stirring of cooking foods applicable to a variety of common cooking utensils. Additionally, the Artin invention treats an appliance having dual mixing implements and means for attachment thereof to the mixing head. The present invention permits unattended mixing of cooking foods and attachment of the mixing device to a wide range of common cooking utensils. And, the mixing process involves a sole implement for effective mixing and stirring.

In U.S. Pat. No. DES. 323,955 to Rixen an ornamental design of a portable electric food mixer is described. The Rixen invention defines an exterior of a self contained hand held portable mixer having no provision for automatic and unattended mixing of cooking foods.

In U.S. Pat. No. Des. 309,081 to Thomas an ornamental design of a portable electric food mixer is described. The Thomas invention defines the mixer head housing exterior of a hand held portable mixer having no provision for automatic and unattended mixing of cooking foods.

As illustrated by the background art, efforts are continuously being made to attempt to mix and stir foods. No prior effort, however, provides the benefits attendant with the present invention. Additionally, the prior patents and commercial techniques do not suggest the present inventive combination of component elements arranged and configured as disclosed and claimed herein.

Therefore, it can be appreciated that there exists a continuing need for automatic stirrers which can be employed to provide for the automatic mixing and stirring of foods during cooking. In this regard, the present invention substantially fulfills this need.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types now present in the prior art, the present invention provides an improved automatic stirrer construction wherein the same can be utilized for the automatic and unattended stirring of foods during cooking. As such, the general purpose of the present invention, which will be described subsequently in greater detail, is to provide a new and improved automatic stirrer apparatus and method which has many of the advantages of the prior art automatic stirring apparatus and few of the disadvantages.

The invention is defined by the appended claims with the specific embodiment shown in the attached drawings. For the purpose of summarizing the invention, the invention may be incorporated into a battery powered electronically controlled motor section engaging a shaft mounted adjustable set of stirrer blades. The battery, motor, electronic control, and shaft are contained within a lid portion fitting a wide variety of cookware. The stirrer blade set is detachably connected to the shaft thereby facilitating cleaning and introduction of alternate blade styles. The automatic stirrer is placed over and adjusted to fit a pot or similar cooking utensil containing food requiring mixing or stirring during the cooking process. Speed and time settings are made using the electronic control feature and the unattended stirrer cycle is started by a switch closure.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention may be better understood so that the present contribution to the art can be more fully appreciated. Additional features of the invention will be described hereinafter which form the subject of the claims of the invention. It should be appreciated by those skilled in the art that the conception and the disclosed specific methods and structures may readily be utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved automatic stirrer.

It is a further object of the present invention to provide a new and improved automatic stirrer which is of a durable and reliable construction.

An even further object of the present invention is to provide a new and improved automatic stirrer which is susceptible of a low cost of manufacture with regard to both materials and labor, and which accordingly is then susceptible of low prices of sale to the consuming public, thereby making such automatic stirrers economically available to the buying public.

Still yet another object of the present invention is to provide a new and improved automatic stirrer which provides in the apparatuses and methods of the prior art some of the advantages thereof, while simultaneously overcoming some of the disadvantages normally associated therewith.

Still another object of the present invention is to provide a new and improved automatic stirrer which serves a purpose of automatically stirring foodstuffs during cooking.

Yet another object of the present invention is to provide a new and improved automatic stirrer which incorporates a self contained battery powered motor and control which facilitates safe, unattended stirring of foods thereby providing the food preparation industry and general consumer market with enhanced mixing and stirring capabilities.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding may be had by referring to the summary of the invention and the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the automatic stirrer of the present invention in an "off" position.

FIG. 2 is a side sectional view of the automatic stirrer taken substantially upon the plane indicated by the section line 2—2 of FIG. 1.

FIG. 3 is a top plan view of the automatic stirrer.

FIG. 4 is a fragmentary side sectional view of the automatic stirrer showing electromechanical drive components.

FIG. 5 is a perspective view of an alternate embodiment of an automatic stirrer wherein a modified blade set is employed.

FIG. 6 is a fragmentary sectional view of the alternate embodiment of the automatic stirrer modified blade set taken substantially upon the plane indicated by the section line 6—6 of FIG. 5.

DESCRIPTION OF THE PREFERRED EMBODIMENT

With reference now to the drawings, and in particular to FIG. 1 thereof, a new and improved automatic stirrer embodying the principles and concepts of the present invention and generally designated by the reference numeral 10 will be described.

From an overview standpoint, the automatic stirrer 10 is adapted for use by a human primarily to stir foodstuffs during unattended cooking. Additionally, the invention may be employed for the automatic and unattended stirring of non-foods under heating or non-heating conditions therefore the reference to cooking herein may be construed to include a far reaching and wider range of stirring appicable to materials processing, commercial processing, and laboratory research. Referring to FIG. 1, the automatic stirrer 10 comprises a lid section 12, a shaft upper portion 14, a shaft lower portion 16, and a blade section 18. Lid 12 which covers a cooking utensil and positions blade section 18 within the food requiring stirring comprises a motor and control section 20, power switch 22, speed switch 24, and a plurality of thumbscrews 26 shown in FIG. 2. See FIGS. 3 and 4. Shaft upper portion 14 is mechanically driven by an electric motor 60 within the motor and control section 20 and engages lower shaft portion 16 to effect spinning motion of the blade set 18 within the foodstuff at a rate selected by speed switch 24. The power switch 22 may include a timer function wherein the stirrer will operate only for a time selected and at the speed selected using speed switch 24. Additionally, the timer may be configured, through the use of a microprocessor or hardwired electronic logic functions, to perform a sequential change in speed at user selected intervals which are entered into the control section using an external data entry means such as a keypad or switch matrix.

More specifically, it will be noted that the automatic stirrer 10 is configured as a lid 12 for cooking utensil 28 and is affixed to a cooking utensil 28 using a plurality of thumbscrews 26. See FIGS. 1 and 2. Lid 12 has a lip portion 30 which extends over the top of utensil 28 and a plurality of ears 32 through which a plurality of thumbscrews 26 are threadedly engaged.

FIG. 4 shows the introduction of a gasket 64 between the cooking utensil 28 and lid 12 wherein the gasket 64 prevents foodstuffs from exiting utensil 28 during stirring. Gasket 64 may or may not form a pressure seal with lid 12. Each thumbscrew 26 terminates in a soft end tip 34 affixed by snapping over a mushroom shaped fastener end which permits free rotation of tip 34 about the long axis of the thumbscrew 26. The soft tip end 34 prevents scratching by providing a rotational bearing surface at the interface of the tip 34 and thumbscrew 26 and prevents point compression damage to cooking utensil 28 by effectively increasing the contact area of thumbscrew 26 and cooking utensil 28.

Lid 12 holds the motor and control section 20 and positions the upper shaft section 14 near the center of any cooking utensil 28. Motor and control section 20 comprises a battery compartment 50 containing one or more electrical batteries 62 providing electrical power for control and motor 60 functions.

Motor 60 drives an upper shaft section 14 into which a lower shaft portion 16 is slidably inserted and locked into position by setscrew 20. Lower shaft portion 16 and blade set 18 are positioned at a desirable location within the cooking utensil 28 prior to tightening setscrew 20. Blade set 18 comprises four paddle style blades 40 curved to direct the flow of fluids upward and away from the hot bottom of cooking utensil 28. Each paddle style blade 40 is widest at the end most distant from the lower shaft portion and no point on the paddle style blades extends below the lower shaft portion 16 bottommost shaft end as can be seen in FIG. 1, the paddles have wide ends and narrow ends with the narrow ends located at the point of attachment to the shaft. In addition, the paddles have curvatures at their upper and lower edges about a line perpendicular to the drive shaft. In addition, the lower edges of the paddles adjacent to the drive shaft and the end of the drive shaft are in a common plane.

Battery 62 may be of a rechargeable type with a provision for recharge in the motor and control section 20, or of a non-rechargeable type such as alkaline or lithium-sulfur dioxide cells may be employed.

Motor 60 may include a gear train designed to provide a proper speed and torque range for stirring the widest variety of foodstuffs including high and low viscosity fluids and heterogeneous liquids and powders.

In an alternate embodiment, an opening or otherwise transparent window section 52 is provided in lid 12 to enable free viewing of the stirring process. See FIG. 3. Window section 52 may be devised to preclude air flow through lid 12 or, alternately, be configured as a vent comprising a fixed or variable aperture portion used to regulate air and vapor flow through window section 52.

In another alternate embodiment, power switch 22 is incorporated at least in part into an electronic or mechanical timer which enables running of the automatic stirrer 10 at a speed selected by operating speed switch 24 for a duration set by a user through either an electronic analog or digital data entry means or through setting a spring driven rotatable mechanical timer, note FIG. 1. At the end of the set duration the automatic stirrer 10 turns off and may simultaneously activate an electronic or mechanical alarm.

Additionally, the automatic stirrer 10 may be fitted with an alternate set of mixing blades such as a blade set 70 shown in FIG. 5. In the alternate embodiment of FIG. 5, four planar blades are affixed to lower shaft portion 74 such that each blade 72 is set at an angle with the lower shaft portion 74. The angular disposition of blades 72 produces a well defined flow in the foodstuff generally moving hotter material from the bottom 29 of cooking utensil 28 to the cooler upper regions.

In yet another alternate embodiment, shown in FIG. 6, the lower edge of blade 72 terminates in a V-shaped edge 76 which is made to contact the interior bottom of cooking utensil 28. The sweeping action of V-shaped edge 76 prevents foods from sticking to the cooking utensil 28 during the cooking process.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are .intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by Letters Patent of the United States is as follows:

1. A new and improved automatic stirrer for unattended automatic stirring comprising:
   a lid section attachable to a wide range of cooking containers, said lid section having a plurality of thumbscrews for engaging the side of the cooking container, said thumbscrews including freely spinning attached pads adapted to engage the container, with a gasket sealing means provided in said lid section and adapted to engage said cooking container;
   said lid section having a transparent viewing window for permitting periodic visual monitoring of foodstuff in the cooking container;
   an electrically powered driving means affixed to said lid section and powering a driving shaft and further including a manually selected electric driving speed member comprising a multiple position electrical switch to enable selection of stirring speed and further including a timer, said timer adapted to automatically terminate stirrer operation upon reaching the end of a manually selected interval, the electrically powered driving means deriving its electrical power from electrical batteries;
   a set of stirring blades attached to a driven shaft, said driven shaft engaging the driving shaft of said electrically powered driving means, the stirring blades comprising elongated tapered paddles having a lower edge and a narrow end at the point of attachment to the driven shaft; said paddles having a curvature about a line perpendicular to the driven shaft and passing through the point of attachment of the paddle to the driven shaft; and the lower edge of said paddles and the end of the driven shaft being located in a common plane.

* * * * *